US012386921B2

United States Patent
Biswas et al.

(10) Patent No.: US 12,386,921 B2
(45) Date of Patent: Aug. 12, 2025

(54) REACTIVE VIRAL SPAM DETECTION

(71) Applicant: Microsoft Technology Licensing, LLC, Redmond, WA (US)

(72) Inventors: Anirban Biswas, Bangalore (IN); Sumit Srivastava, Bangalore (IN); Srinivasa Madhava Phaneendra Angara, Bengaluru (IN); Nishka Krishnappa Saligrama, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 51 days.

(21) Appl. No.: 18/452,707

(22) Filed: Aug. 21, 2023

(65) Prior Publication Data
US 2025/0068699 A1     Feb. 27, 2025

(51) Int. Cl.
G06F 18/2415     (2023.01)
H04L 51/212     (2022.01)

(52) U.S. Cl.
CPC ........ *G06F 18/2415* (2023.01); *H04L 51/212* (2022.05)

(58) Field of Classification Search
CPC ........ G06Q 50/01; H04L 51/212; H04L 51/52
See application file for complete search history.

(56) References Cited

U.S. PATENT DOCUMENTS

| | | | |
|---|---|---|---|
| 10,152,544 B1 * | 12/2018 | Friggeri | G06Q 50/01 |
| 2014/0172989 A1 * | 6/2014 | Rubinstein | H04L 51/212 |
| | | | 709/206 |
| 2014/0237093 A1 * | 8/2014 | Hofman | G06Q 50/01 |
| | | | 709/223 |

(Continued)

FOREIGN PATENT DOCUMENTS

| | | | | |
|---|---|---|---|---|
| CN | 112199608 A | * | 1/2021 | ........... G06N 3/0454 |
| CN | 114238738 A | * | 3/2022 | ........... G06F 16/951 |
| CN | 114443837 A | * | 5/2022 | ........ G06F 18/2415 |

OTHER PUBLICATIONS

Dou, Yingtong, et al. "User preference-aware fake news detection." Proceedings of the 44th international ACM SIGIR conference on research and development in information retrieval. 2021. (Year: 2021).*

He, Li, et al. "Graph-aware deep fusion networks for online spam review detection." IEEE Transactions on Computational Social Systems 10.5 (2022): 2557-2565. (Year: 2022).*

Kapadia, Paritosh, et al. "Co-attention based multi-contextual fake news detection." Complex Networks XIII: Proceedings of the 13th Conference on Complex Networks, CompleNet 2022. Cham: Springer International Publishing, 2023. (Year: 2023).*

(Continued)

*Primary Examiner* — Vivek Srivastava
*Assistant Examiner* — William D McBeth
(74) *Attorney, Agent, or Firm* — NICHOLSON DE VOS WEBSTER & ELLIOTT, LLP

(57) ABSTRACT

Techniques herein balance the need for flexibility with the need accuracy, using a reactive approach to viral spam detection. After content (e.g., a social media platform news feed or timeline post) is created, interaction activity (e.g., content views) with the content is monitored. Based on the monitoring of the interactivity activity, it is determined whether a reactive viral spam analysis condition is satisfied for the content (e.g., because the number of content views exceeds a threshold). In response to determining that the reactive viral spam analysis condition is satisfied, a determination is made whether the content is or is not viral spam. If the content is determined to be viral spam, then it may be reported or flagged for further action (e.g., take down after manual confirmation).

19 Claims, 11 Drawing Sheets

(56) References Cited

U.S. PATENT DOCUMENTS

| | | | | |
|---|---|---|---|---|
| 2016/0164888 | A1* | 6/2016 | Chang | H04L 51/212 726/22 |
| 2017/0324822 | A1* | 11/2017 | Cashmore | H04L 67/535 |
| 2019/0347355 | A1* | 11/2019 | Zhang | G06F 18/24323 |
| 2021/0049441 | A1* | 2/2021 | Bronstein | G06Q 50/01 |
| 2021/0334908 | A1* | 10/2021 | Shu | G06Q 50/01 |
| 2022/0101203 | A1* | 3/2022 | Li | G06Q 50/01 |
| 2022/0253671 | A1* | 8/2022 | Chamberlain | G06Q 50/01 |
| 2022/0382795 | A1* | 12/2022 | Sengupta | G06F 18/24137 |
| 2023/0106416 | A1* | 4/2023 | Gupte | H04L 51/212 706/45 |

OTHER PUBLICATIONS

Lotfi, Serveh, et al. "Detection of rumor conversations in Twitter using graph convolutional networks." Applied Intelligence 51 (2021): 4774-4787. (Year: 2021).*

Qian, Jing, et al. "Leveraging Intra-User and Inter-User Representation Learning for Automated Hate Speech Detection." Proceedings of the 2018 Conference of the North American Chapter of the Association for Computational Linguistics: Human Language Technologies, vol. 2 (Short Papers). 2018. (Year: 2018).*

Vu, Dang Thinh, and Jason J. Jung. "Rumor detection by propagation embedding based on graph convolutional network." International Journal of Computational Intelligence Systems 14.1 (2021): 1053-1065. (Year: 2021).*

Yu, Ke, et al. "Data fusion oriented graph convolution network model for rumor detection." IEEE Transactions on Network and Service Management 17.4 (2020): 2171-2181. (Year: 2020).*

Huang, Di, Jacob Bartel, and John Palowitch. "Recurrent Graph Neural Networks for Rumor Detection in Online Forums." arXiv preprint arXiv:2108.03548 (2021). (Year: 2021).*

Kaur, Harveen. "Using Network Analysis to Detect Fake News in Social Media." 2023 14th International Conference on Computing Communication and Networking Technologies (ICCCNT). IEEE, 2023. (Year: 2023).*

Rosenfeld, Nir, Aron Szanto, and David C. Parkes. "A Kernel of Truth: Determining Rumor Veracity on Twitter by Diffusion Pattern Alone." In Proceedings of the Web Conference 2020, pp. 1018-1028. 2020. (Year: 2020).*

"Wiener index", Retrieved from: https://en.wikipedia.org/wiki/Wiener_index#:~:text=In%20chemical%20graph%20theory%2C%20the,hydrogen%20atoms%20in%20the%20molecule., Jan. 29, 2023, 5 Pages.

Goel, et al., "The Structural Virality of Online Diffusion", In Journal of Management Science, vol. 62, Issue 1, Jan. 2016, pp. 180-196.

Hamilton, et al., "Inductive Representation Learning on Large Graphs", In Repository of arXiv:1706.02216v4, Sep. 10, 2018, 19 Pages.

\* cited by examiner

FIG. 7

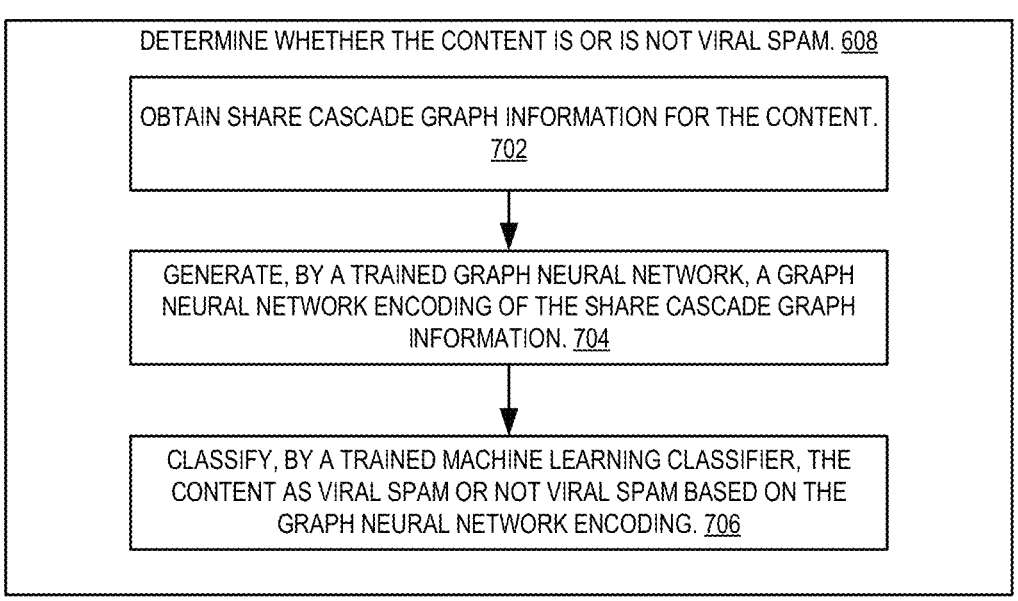

```
DETERMINE WHETHER THE CONTENT IS OR IS NOT VIRAL SPAM. 608

OBTAIN SHARE CASCADE GRAPH INFORMATION FOR THE CONTENT.
    702
                                │
                                ▼
    GENERATE, BY A TRAINED GRAPH NEURAL NETWORK, A GRAPH
    NEURAL NETWORK ENCODING OF THE SHARE CASCADE GRAPH
    INFORMATION. 704
                                │
                                ▼
    CLASSIFY, BY A TRAINED MACHINE LEARNING CLASSIFIER, THE
    CONTENT AS VIRAL SPAM OR NOT VIRAL SPAM BASED ON THE
    GRAPH NEURAL NETWORK ENCODING. 706
```

REACTIVE VIRAL SPAM DETECTION

TECHNICAL FIELD

A technical field to which the present disclosure relates is viral spam detection.

BACKGROUND

A social media platform is an online service or website that allows users to create and share content, interact with other users, and build virtual communities. These platforms provide users with tools and features to connect with friends, family, acquaintances, and even strangers from around the world. Users can create personal profiles, post updates, share photos and videos, and engage in various forms of communication such as messaging, commenting, and liking.

Social media platforms typically have a news feed or timeline where users can see updates from people and pages they follow. They also offer mechanisms to discover and connect with new individuals or organizations based on shared interests, location, or mutual connections. Some platforms focus on specific types of content, such as image-sharing or short-form videos, while others offer a broader range of features. Each platform has its own unique features, user base, and target audience, but they all facilitate social interaction, content sharing, and community building in some form.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 7 illustrates a first method for determining whether the content is or is not viral spam, according to some embodiments.

DETAILED DESCRIPTION

Figure 1:
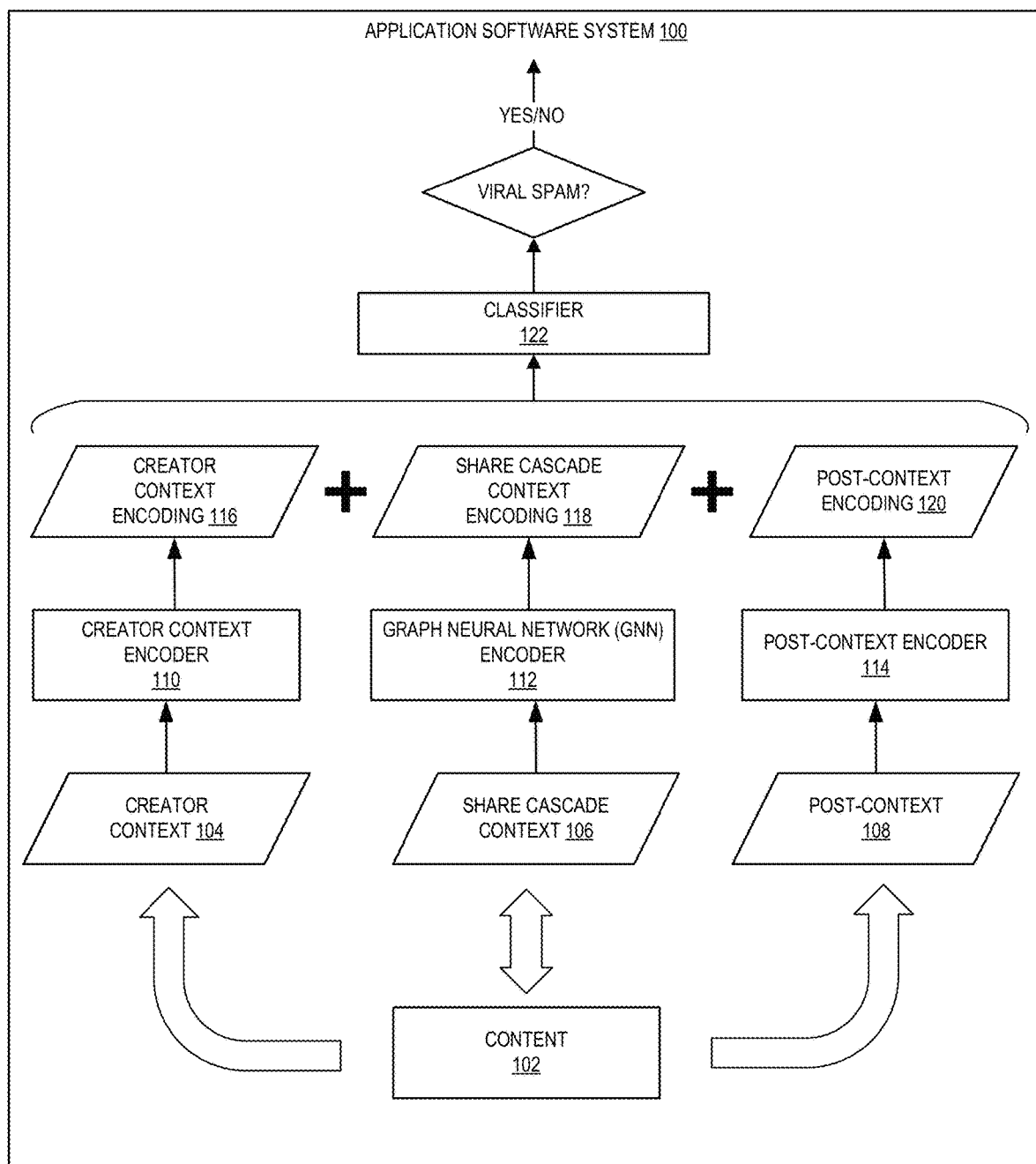
FIG. 1 illustrates a multi-user application software system for reactive viral spam detection, according to some embodiments.

Computer-implemented systems, methods, and non-transitory machine-readable storage media (collectively, "techniques") are disclosed for a reactive approach to viral spam detection.

The timing and scope of viral spam detection analysis can be vitally important to the success of the analysis. Unfortunately, there is no one best time to conduct the analysis. So, flexibility is needed. Along with the need for flexibility, there is a need for accuracy in the analysis.

Techniques herein balance the need for flexibility with the need for accuracy, using a reactive approach to viral spam detection. After content (e.g., a social media platform news feed or timeline post) is created, interaction activity (e.g., content views) with the content is monitored. Based on the monitoring of the interactivity activity, it is determined whether a reactive viral spam analysis condition is satisfied for the content (e.g., because the number of content views exceeds a threshold). In response to determining that the reactive viral spam analysis condition is satisfied, a determination is made whether the content is or is not viral spam. If the content is determined to be viral spam, then it may be reported or flagged for further action (e.g., take down after manual confirmation).

In some embodiments, determining whether the content is or is not viral spam is based on obtaining share cascade graph information for the content. The share cascade graph information reflects the virality of the content in terms of how the content has been shared since its creation. A trained graph neural network is used to generate a graph neural network encoding (e.g., an embedding) of the share cascade graph information. Then, a trained machine learning classifier is used to classify the content as viral spam or not viral spam based on the graph neural network encoding.

In some embodiments, in addition to classifying the content as viral spam or not viral spam based on the graph neural network encoding, the content is classified using the trained machine learning classifier based on a "post context" encoding and a "creator context" encoding. The post context encoding encodes interaction with the content since its creation (e.g., commenting activity on the content). The creator context encoding encodes prior interaction by the creator of the content with other content prior to the creation of the content (e.g., pre-content creation commenting activity by creator). The training machine learning classifier is used to classify the content as viral spam or not viral spam based on the graph neural network encoding, the post context encoding, and the creator context encoding.

As an example of the problem addressed herein, consider news feed or timeline content posts by users of a social media platform. The social media platform may wish to prevent or deter viral spam on the platform. Viral spam is spam content (e.g., misinformation, hate speech, vulgar speech, etc.) that spreads relatively rapidly on the social media platform. Viral spam can cause significant damage to the platform through the erosion of user trust in the platform. It can be very difficult to predict whether content will become viral spam soon after the content is created when few or no signals about the virality of the content are available. Thus, a predictive approach to viral spam detection can tend to have too many false negatives, especially where spam content is carefully crafted to avoid a more predictive filter. As such, a reactive approach to viral spam detection is important. A reactive approach is important not only for the social media platforms operators which may reduce or eliminate user engagement with viral spam content, but also to users who can use the platform with little or less confusion and disruption caused by viral spam. The techniques provide for better detection of viral spam. Further, the techniques can be used for more than just social media platform posts. They can be used for virtually any type of user-generated content (posts, email messages, images, short-form videos, etc.)

The techniques use a reactive approach in which content is analyzed sometime after its creation to determine if it is or is not viral spam after there is some indication that the content is going viral or is about to go viral. The trigger for analyzing content is satisfaction of a reactive viral spam analysis condition for the content. In some embodiments, the condition is a number of views of the content by users within a period of time (e.g., the past six, twelve, or twenty-four hours) exceeding a threshold number of views. By waiting until there is an indication that the content is or may go viral, information about the content that has become available since its creation including share cascade graph information and post context information can be leveraged to make a more accurate prediction as to whether the content is or is not viral spam. Over time, a combination of a predictive approach that attempts to detect viral spam soon after its creation and the reactive approach that can catch viral spam that is not detected by the predictive approach will provide protection for a social media platform against damaged caused by viral spam.

The techniques proceed in some embodiments by monitoring interaction activity with content created and distributed by a multi-user application software system. Based on the monitoring of the interaction activity, a determination is made whether a reactive viral spam analysis condition is satisfied. In response to determining that the reactive viral spam analysis condition is satisfied, a determination is made whether the content is viral spam or not viral spam. In some embodiments, determining whether the content is or is not viral spam is based on obtaining share cascade graph information for the content, using a trained graph neural network to generate a graph neural network encoding of the share cascade graph information, and using a trained machine learning classifier to classify the content as viral spam or not viral spam based on the graph neural network encoding.

Turning now to FIG. 1, it illustrates multi-user application software system 100 for reactive viral spam detection, according to some embodiments. At a high-level, user-generated content 102 is created in system 100. Creator context 104, share cascade context 106, and post context 108 is obtained for content 102. Creator context encoder 110 encodes creator context 104 to yield creator context encoding 116. Graph neural network (GNN) encoder 112 encodes share cascade context 106 to yield shared cascade context encoding 118. Post context encoder 114 encodes post context 108 to yield post context encoding 120.

In some examples, a combination of creator context encoding 116, share cascade context encoding 118, and post context encoding 120 is input to classifier 122. Classifier 112 outputs a binary decision as to whether content 102 is or is not viral spam. If classifier 112 determines content 102 is viral spam, then content 102 can be flagged or reported for additional review. Based on the additional review, content 102 may be made unavailable for future viewing using system 100 or demoted or otherwise configured to dampen or suppress the virality of content 102 on system 100.

While in some examples a combination of all three of creator context encoding 116, share cascade context encoding 118, and post context encoding 120 is input to classifier 122, only one or two are input to classifier 122 in other examples. For example, just share cascade context encoding 118, just creator context encoding 116 and share cascade context encoding 118, or just share cascade context encoding 118 and post context encoding 120 can be input to classifier 122.

Also, while in some examples classifier 122 is a binary classifier that classifies inputs into one of two possible classes (e.g., viral spam and not viral spam), classifier 122 can be a multi-class classifier that classifies input into one of three or more possible classes. For example, the multiple classes may encompass a class for non-viral spam and multiple classes for viral spam where each of the viral spam classes represents a different type of viral spam (e.g., misinformation viral spam, hate or offense speech viral spam, etc.)

Returning to the top of FIG. 1, multi-user application software system 100 in some embodiments encompasses one or more large-scale websites with many users and managing many content items such as, for example, any or all of the following types of websites: events, e-commence, content streaming, news, social networking, travel, content management, collaborative content management, job search, employment recruiting, etc. While in some embodiments all of the functionality and capabilities of application software system 100 is implemented by one or more server computers such as one or more server computing devices housed or collocated in a data center facility, some or all of the functionality and capabilities of application software system 100 is implemented on a client computing device such as a personal computing device or an edge computing device. Thus, the techniques disclosed herein are not limited to the client-server or cloud-computing arrangement but can be implemented by other types of computing architectures such as, for example, by an edge computing architecture where the techniques are implemented by an edge computing device or a distributed computing architecture where a portion of the techniques are implemented at the edge and a portion of the techniques are implemented in the cloud.

Application software system 100 allows for the generation of user-created content such as content 102. Content 102 encompasses any content created and shared by a user of system 100, rather than by the organization or platform hosting system 100 and content 102. Content 102 can take various forms across different platforms and mediums. For example, content 102 may encompass any or all of: a social media post encompassing any or all of a photo, a video, a text update, a meme, or other content created by a user to share their thoughts, experiences, or creativity; a user-generated review and rating that shares a user's opinion or experience with a product, service, restaurant, hotel, or movie; a blog comment left by a user on a blog post, sharing their thoughts, feedback, or engaging in discussions with the blog post's author or other readers; a forum thread such as a discussion or conversation taking place in an online forum where a user interacts with other users and contributes information, advice, or opinions on a topic; a user-created video such as a vlog, tutorial, reaction video, or other video content generated by an individual creator; fan art such as an artwork, illustration, or graphic created by a fan to show their appreciation for a particular franchise, movie, television show, video game celebrity; a user-generated poll or survey where an individual shares their opinions or insights on a specific topic; a user-generated challenge or trend started by a user encouraging others to participate and create their own content following a specific theme or format; a crowdsourced idea where a user submits an idea or suggestion for a new product, feature, or improvement, thereby contributing to the idea development process; a customer testimonial such as a user testimonial or success story shared by a user about their positive experiences with a product, service, or band; an online competition such as a contest organized by a brand or platform that invites a user to submit their content (e.g., photo, video, story) to participate and win prizes; user-generated music such as a music cover, remix, or original compositions created and shared by a user; or any other suitable user-generated or user-provided content.

In some examples, content 102 may encompass spam content. While a universal and precise definition of spam content may be elusive, spam content generally refers to unsolicited, irrelevant, inappropriate, annoying, disruptive, or harmful content. Spam content may be designed to misinform (e.g., provide misleading or false information about vaccines). Spam content may encompass hate speech or hurtful speech. Spam content may encompass malicious links, viruses, or phishing attempts to device recipients or steal their personal information. Spam content may be created using deceptive tactics such as misleading subject or topic lines, false sender or creator information, or disguised content designed to bypass spam filters and trick recipients into viewing or otherwise interacting with the content. Examples of spam content include unwanted promotional content, phishing content that attempts to trick users into revealing sensitive information like passwords or credit card details, chain letters, message with dubious claims (e.g., a get-rich-quick scheme). Spam content can be a widespread issue to system 100 and can be annoying, disruptive, and potentially harmful to users of system 100. System 100 may employ the reactive viral spam techniques disclosed herein to detect and block viral spam content before it causes more or significant damage to system 100.

Content 102 is associated with a creator. The creator is a user of system 100 that created content 102 and submitted it to system 100. The creator typically corresponds to a user account held with system 100 or used to authenticate the creator with system 100. As such, the creator of content 102 may be known to system 100 in the form of a suitable user or user account identifier such as a username, an email address, or a numeric or alphanumeric identifier assigned to the creator within system 100.

System 100 uses various information about content 102 available in system 100 to make a determination of whether content 102 is or is not viral spam. In some embodiments, system 100 uses at least share cascade context 106 about content 102 to make a determination of whether content 102 is or is not viral spam. System 100 may also use creator context 103 or post context 108 about content 102 to make the determination. Share cascade context 106 comprises data that reflects share cascade information about content 102. The share cascade information reflects how content 102 has been shared and reshared by users using system 100 beginning with the initial share of content 102 by the creator of content 102. For example, the initial share of content 102 by the creator may correspond to creator posting or publishing content 102 to their social networking feed or timeline or otherwise sharing content 102 with one or more other users of system 100.

Content 102 can be shared among users of system 100 through various mechanisms and features of system 100 designed to facilitate sharing and collaboration. System 100 may have built-in sharing buttons or operations that allow users to share content quickly and easily with others. System 100 may allow a user to click on a "Share" button to post content on their profile or share it with specific contacts. System 100 may allow a user to repost or reblog content created by others to their own profile, thereby extending its reach to their followers or connections. System 100 may allow users to tag or mention other users when sharing content. This may notify the tagged users, and the content may appear on their profiles or be highlighted in some way to indicate the association. System 100 may allow users to forward content by sharing links to articles, videos, or other media with their contacts. System 100 may allow users to share content with specific users or teams for real-time collaboration and feedback. System 100 may offer granular control over sharing permissions, allowing users to decide who can view, edit, or share the content they create. Some content may be made public and accessible to all users of system 100, depending on the privacy settings and platform policies. System 100 may offer application programming interfaces (APIs) allowing developers to integrate sharing functionality into third-party applications or services, enabling content to be shared across multiple platforms. System 100 may allow users to share contact generated by other users to showcase and promote interesting or popular contributions.

When content 102 is shared, new content may be added or combined with content 102. In particular, the sharing of content 102 may be viewed as a starting point or a base for other users to add new content or contribute their own ideas. System 100 may support a collaborative process that allows multiple users to build upon the shared content, creating a more comprehensive or enriched piece. System 100 may allow users to comment on shared content, providing their own insights, feedback, or opinions, or responding to these comments, initiating discussions and expanding on original ideas. System 100 may allow multiple users to simultaneously work on shared content where they make edits, add new sections, or update information, all of which contribute to the evolving content. System 100 may allow users to remix or mash up shared content to create something new including combining elements from different sources or adding their own creative ideas. System 100 may allow users to annotate or mark up shared content to highlight specific points, add explanations, or provide context. System 100 may allow users to create their own content inspired by shared content in the form of responses, comments, fan art, user reviews, or related posts.

Sharing of content 102 can cascade. The cascading effect of content sharing refers to the way in which shared content can spread and propagate through a network (e.g., a social or professional network), reaching a broader audience as each user shared it with one or more of their connections. System 100 may facilitate the cascading effect through the encouragement of sharing and engagement. The cascading effect can be quite powerful, leading to a viral spread of shared content across system 100. A user may use system 100 (e.g., a social media platform, a blog, a messaging app, or any other content-sharing platform) to initially share content 102, such as a post, video, image, or link. As a result, content 102 is exposed to followers, friends, or connections of the user that shared content 102. For example, these users may view content 102 in their feeds or timelines. If content 102 resonates with the initial user's audience, they may decide to use system 100 to share it with their own followers or friends, thereby creating a new cycle of exposure and sharing. Content 102 has now reached the second level of connections—those who follow or are friends with the user who reshared it. This extends the reach of content 102 further. This process may continue with more users sharing content 102 with their networks, and each subsequent sharing cycle exposing content 102 to even more people. Thus, content 102 may have viral potential, if content 102 is highly engaging, emotional, humorous, controversial, informative, or spam. As content 102 spreads on system 100, more users may engage with it, leaving comments, likes, or other forms of interaction. This engagement further boosts the visibility of content 102 on system 100, promoting it to more users.

Share cascade context 106 comprises data representing a graph. The graph represents a share cascade of content 102 by representing the relationships and interactions between users and the content they share. The graph may encompass nodes (vertices) that represent content and edges (connections) that represent sharing actions between them. Each node (vertices) in the graph represents content. The edges (connections) between nodes representing the sharing actions or interactions. The direction of the edge indicates the direction of sharing. For example, an edge from a node representing Content A to a node representing Content B that includes Content A represents a user X sharing Content A with one or more connections in user X's network. The node representing Content B represents Content B as reshared by one of user X's connections. The graph may start with an initial (root) node (vertex) representing content 102 that was first shared such as an original post or video. However, the graph may start with an initial (root) node (vertex) representing content 102 that was reshared. The initial (root) node (vertex) may have one or more outgoing edges (connections) to represent the initial sharing by the user who created content 102. As other users come across shared content 102 and decide to reshare it with their own connections, new nodes (vertices) may be added to the graph to represent these reshares, and new edges (connections) may be added to the graph to represent the resharing actions. The reshared content nodes become the starting points for further sharing by other users, leading to a cascading effect. This creates a branching structure in the graph, where multiple users share content 102, and each shared content node can lead to additional content nodes. Content 102 that experiences a significant cascade of sharing can create viral paths in the graph, with many users involved in the sharing process.

Figure 2:
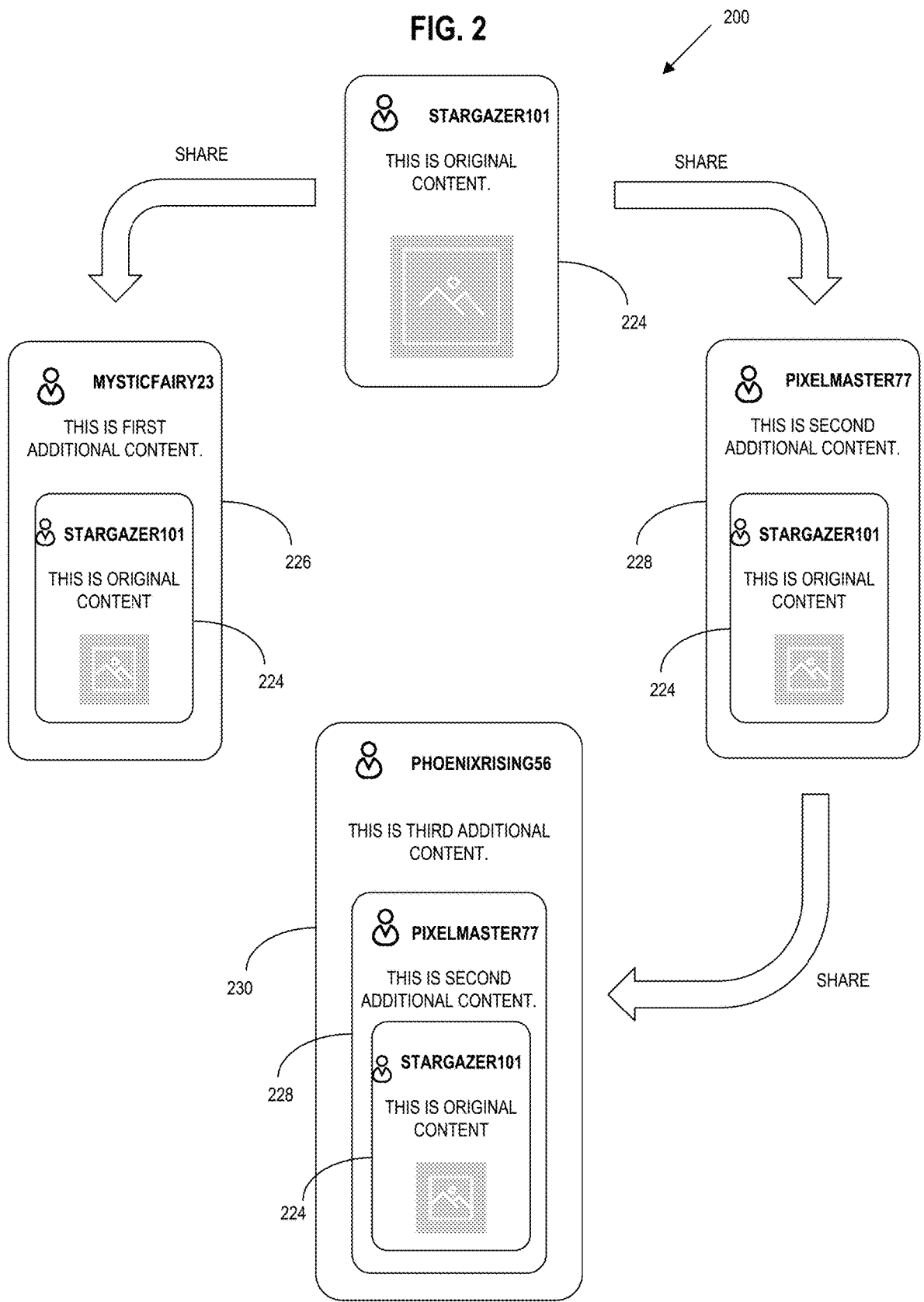
FIG. 2 illustrates an example share cascade graph, according to some embodiments.

FIG. 2 illustrates example share cascade graph 200, according to some embodiments. A user "stargazer101" creates content 224. Content 224 includes the text "This is original content."

and a digital image (photo). The initial (root) node (vertex) of graph 200 represents content 224. User "stargazer101" shares content 224 with their friends or connections in a social or professional network including users "mysticfairy23" and "pixelmaster77," among potentially one or more other users.

Content 226 comprises content 224 and includes the additional text "This is first additional content." Content 226 includes a reshare of content 224 with the additional text by user "mysticfairy23" with their friends or connections in the social network. Graph 200 has a node representing content 226 with a directed edge (connection) from the node (vertex) representing content 224 to the node (vertex) representing content 226 to represent the resharing action by user "mysticfairy23."

Content 228 also comprises content 224 and includes the additional text "This is second additional content." Content 228 includes a reshare of content 224 with the additional text by user "pixelmaster77" with their friends or connections in the social network including user "phoenixrising56." Graph 200 has a node (vertex) representing content 228 with a directed edge (connection) from the node (vertex) representing content 224 to the node (vertex) representing content 228 to represent the resharing action by user "pixelmaster77."

Content 230 comprises content 228 which comprises content 224 and includes the additional text "This is third additional content." Content 230 includes a reshare of content 228 with the additional text by user "phoenixrising56" with their friends or connections in the social network. Graph 200 has a node (vertex) representing content 230 with a directed edge (connection) from the node (vertex) representing content 228 to the node (vertex) representing content 230 to represent the resharing action by user "phoenixrising56."

A graph representing a share cascade of content can be predictive of viral spam. Patterns and characteristics within the graph can indicate suspicious or manipulative behavior commonly associated with viral spam. For example, viral spam can exhibit an unusually rapid and unnatural growth path in the graph. With non-spam content cascades, user engagement, such as likes, comments, and shares can increase as the content spreads. Viral spam, however, may show low engagement, negative engagement, contradictory engagement, or an absence of meaningful interactions, indicating that the content is not genuinely resonating with users or is confusing users. Viral spam may be repeatedly reshared by numerous accounts, resulting in a dense network of connections in the graph. This high volume of resharing by different users, particularly with limited or no interactions, can be represented by the graph. The graph may reveal clusters of spammy user accounts that participate in multiple content cascades. These accounts may lack organic interactions and may be primarily involved in sharing spam content. Viral spam campaigns may use bots or automated scripts to share spam content on a massive scale. The graph may show patterns of repetitive and rapid sharing, indicative of automated behavior. Viral spam campaigns may use similar or identical spam content across multiple nodes in the graph. The graph can be useful for detecting identical or highly similar content. Viral spam may contain malicious links or phishing attempts, leading users to dangerous websites or attempting to collect sensitive information. The graph can be analyzed to help spot patterns associated with these types of harmful viral spam campaigns.

In addition to representing the content involved in a share cascade, a node (vertex) in a share cascade graph can be associated with data (e.g., key-value pairs) that represent various features including network features and behavioral features of the creator of the content and features about the content itself (content features). Network features of the creator may include the number of friends/connections with which the content is shared. Behavioral features of the creator may include the number of past spam posting offenses by the creator. Content features may include positive engagement signals such as the number of likes of the content or the number of shares of the content, negative engagement signals such as the number of user reports of the content, and a sentiment score that represents whether the content expresses a positive, negative, or neutral polarity.

For example, referring again to FIG. 2, the node (vertex) representing content 224 may be associated data (e.g., key-value pairs) representing some or all of the following features: the number of users in a social network that user "stargazer101" shared content 224 with (which may be more than just the two depicted in FIG. 2), the number of past spam posting offenses by user "stargazer101," the number of likes of content 224 as shared by user "stargazer101," the number of shares of content 224 as shared by user "stargazer101," the number of dislikes of content 224 as shared by user "stargazer101," the number of user reports of content 224 as shared by user "stargazer101," a sentiment score that representing whether content 224 expresses a positive, negative, or neutral polarity, or any other suitable creator or content features.

As another example, again referred to FIG. 2, the node (vertex) representing content 230 may be associated data (e.g., key-value pairs) representing some or all of the following features: the number of users in a social network that user "phoenixrising56" shared content 230 with, the number of past spam posting offenses by user "phoenixrising56," the number of likes of content 230 as shared by user "phoenixrising56," the number of shares of content 230 as shared by user "phoenixrising56," the number of dislikes of content 230 as shared by user "phoenixrising56," the number of user reports of content 230 as shared by user "phoenixrising56," a sentiment score that representing whether content 230 expresses a positive, negative, or neutral polarity, or any other suitable creator or content features.

Machine learning can be used to determine the polarity of text of content (e.g., content 224 or content 230). For content, the polarity can be determined for all text of content or just a subset thereof. For example, the polarity can be determined for just the new text of the content. For example, for content 224, the polarity can be determined for the text "This is original content" and for content 230 the polarity can be determined for just the new text "This is third additional content." Alternatively, the polarity can be determined for all text of content such as, for example, the text "This is original content," "This is second additional content," and "This is third additional content" of content 230. In some embodiments, a sentiment score is determined for each sentence or each other type of grammatical unit of content and a final sentiment score is determined by averaging or a weighted average of the individual sentiment scores. For example, a respective sentiment score can be determined for each of the texts "This is original content," "This is second additional content," and "This is third additional content" of content 230. And a final sentiment score can be determined for content 230 by averaging or a weighted averaging of the respective sentiment scores.

As mentioned, machine learning can be used to determine the polarity of text (e.g., whether the text expresses a positive, negative, or neutral sentiment). This may involve training a machine learning model on a labeled dataset of text examples. Each text example may be associated with its corresponding sentiment polarity (e.g., positive, negative, or neutral). To do this, a large dataset of text samples may be collected with their associated sentiment labels. The text samples may be preprocessed to remove noise, special characters, and unnecessary information, or to convert text to lowercase, to tokenize sentences or other grammatical units, or to remove stop words. The preprocessed text samples may then be converted into numerical features that the machine learning model can process. This feature extraction may include any or all of bag-of-words (BoW) text analysis, term frequency-inverse document frequency (TF/IDF) text analysis, or use of word embeddings such as Word2Vec or GloVe. The sentiment labels may also be encoded as numerical values (e.g., 0 for negative, 1 for neutral, and 2 for positive) to facilitate training. The machine learning model can be one appropriate for sentiment analysis such as a Support Vector Machine (SVM), Naïve Bayes, Logistic Regression, or a deep learning model like a Recurrent Neural Network (RNN) or a Transformer-based model like a Bidirectional Encoder Representations from Transformers (BERT) model. To train the model, the labeled dataset can be split into at least training and testing sets and the training set used to train the machine learning model on the extracted features and corresponding sentiment labels. Once trained, the model may be evaluated using the testing set to evaluate the trained model's performance by comparing its predicted sentiment polarities on the testing set with the ground truth labels for the testing set. Evaluation metrics that may be used include any or all of: accuracy, precision, recall, F1 score, or other suitable evaluation metric. Depending on the results of the evaluation, hyperparameters can be fine-tuned or different feature extraction techniques may be experimented with to improve the model's performance. Once the trained model demonstrates satisfactory performance, the trained model can be deployed to analyze the sentiment of text of content represented by a share cascade graph. Text of content can be input to the trained model and the model can predict the polarity of the text as a numerical value representing a positive, a negative, or a neutral sentiment of the text.

Share cascade context 106 for content 102 is input to graph neural network (GNN) encoder 112 to obtain share cascade context encoding 118. GNN encoder 112 is trained to encode share cascade context 106 to obtain encoding 118 for the root node (vertex) of the graph of share cascade context 106. The root node (vertex) represents content that satisfies a reactive viral spam analysis condition such as, for example, content that received more than a threshold number of views since it was created or within a past period of time (e.g., the past 6, 12, or 24 hours).

A goal of GNN encoder 112 is to capture information from the entire share cascade context including node (vertex) features and represent it as a meaningful encoding. GNN encoder 112 may be configured to operate on graph-structured data and may be configured to effectively capture relational information between nodes. The graph of share cascade context 106 may be converted into a suitable data representation that can be input to GNN encoder 112. The conversion may involve representing the nodes and the features thereof and edges of the graph as feature vectors or matrices. Initially, node embeddings for each node including the root note in the graph may be initialized to values that serve as the starting point for a message-passing process of GNN encoder 112. During inference, information from neighboring nodes is aggregated and passed to update the node embeddings iteratively. GNN encoder 112 may perform several iterations of message passing to capture information from neighboring nodes in the share cascade context graph. At each message passing step, GNN encoder 112 may aggregate information from neighboring nodes. The aggregation function may take into account the features of the neighboring nodes and the relationships defined by the edges (connections). For example, the aggregation function may encompass a sum, a mean, or an attention mechanism. After aggregating information from neighbors, GNN encoder 112 may update the node embeddings based on the aggregated messages and the node's current embedding. The update function may vary depending on the GNN encoder 112 used in the implementation at hand. GNN encoder 112 may repeat the message passing and node updating process for a fixed number of iterations (e.g., commonly referred to as "T" iterations), allowing the nodes to gather information from distant neighbors in the graph. After the T iterations of message passing, the root node's embedding is obtained by considering the final state of the root node's embedding after all T iterations. This embedding used as shared cascade context encoding 118 encapsulates information from the entire share cascade graph and represents cascade's content in a meaningful way. Shared cascade context encoding 118 may be input to classifier 122 to determine whether content 102 is or is not viral spam.

In addition to inputting shared cascade context encoding 118 to classifier 122, creator context encoding 116 may be input to classifier 122 to determine whether content 102 is or is not viral spam. Creator context encoding 116 is generated by creator context encoder 110 from creator context 104. Creator context 104 encompasses data that represents information about the creator of content 102. In some embodiments, creator context 104 encompasses a set of time-ordered comments left by the creator on content hosted by system 100. For example, creator context 104 may encompass the last (most recent) N number of comments made by the creator of content 102 prior to creation of content 102.

Figure 3:
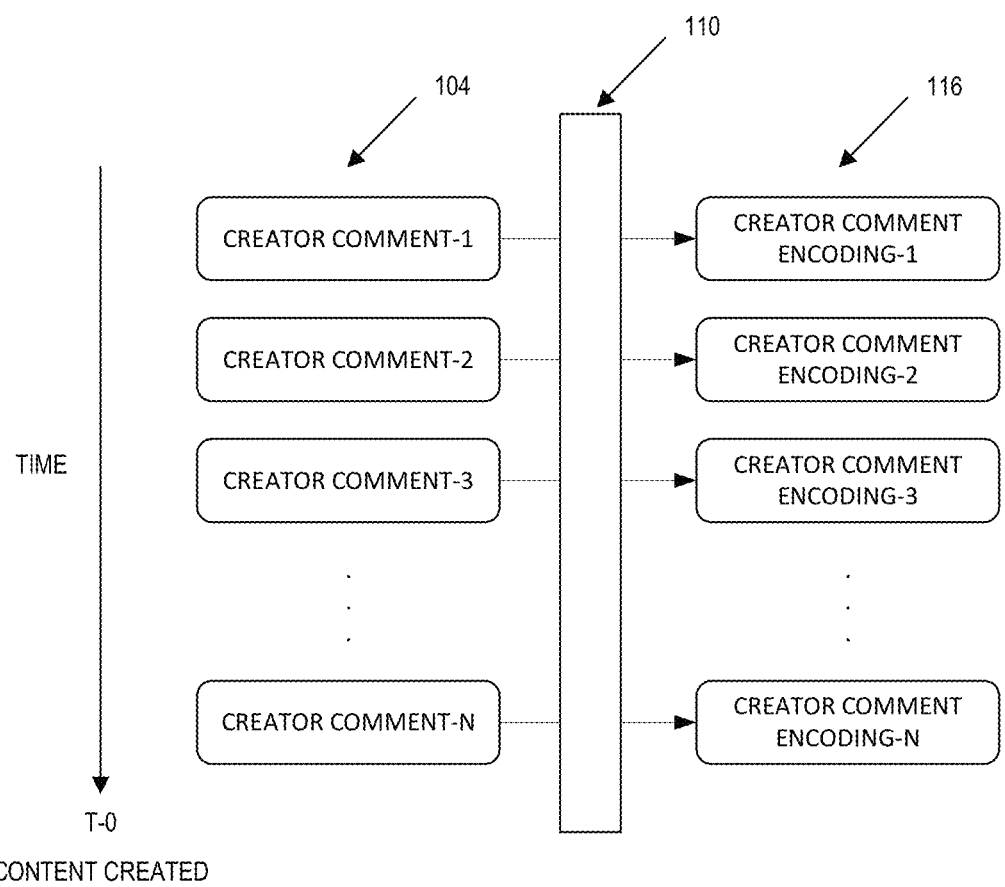
FIG. 3 illustrates example creator context, according to some embodiments.

FIG. 3 illustrates creator context 104, according to some embodiments. A series of N time-ordered comments by the creator of content 102 are made by the creator prior to the creator creating content 102 at time T-0. For example, the comments by the creator may be with respect to other content posted or shared by users of system 100 prior to the creator creating content 102 at time T-0. Creator context encoder 110 is used to generate a respective creator comment encoding for each creator comment of creator context 104. In some embodiments, each creator comment encoding encompasses a three-element embedding for the respective creator comment. Each element of the three-element embedding represents a respective polarity (sentiment) score for the respective creator comment. In particular, one of the elements represents a positive polarity (sentiment) score for the respective creator comment, a second of the elements represents a negative polarity (sentiment) score for the respective creator comment, and a third of the elements represents a neutral polarity (sentiment) score for the respective creator comment. Thus, for N number of creator comments 104, creator context encoding 116 generated by encoder 110 for creator comments 104 may have three (3) times N elements.

In some embodiments, creator context encoder 110 encompasses a recurrent neural network that is trained to generate a three-dimensional embedding representing the sentiment of input text (e.g., a creator comment). Encoder 110 is trained to map variable-length text sequences to fixed-size numerical representations (embeddings). The process may involve using encoder 110 to encode the input text and then using a final layer to project the encoded sequence into a three-dimensional space that captures the sentiment information.

The input creator comment may be tokenized into individual words or sub-words or other tokens. Each token may be represented as a word embedding or other dense numerical vector that captures the token's semantic meaning. These word embeddings may then be passed into the recurrent neural network of encoder 110 one by one, sequentially in the order of appearance in the creator comment. The recurrent neural network may take the sequence of word embeddings as input and process them one at a time. At each time step, the recurrent neural network may take the current word embedding and combine it with the information from the previous time step. This process allows the recurrent neural network to maintain a memory of previous words and consider the entire creator comment text sequence while generating the three-dimensional embedding.

After processing all the word embeddings of the creator comment, the recurrent neural network may produce an output at the final time step. This output contains information about the entire creator comment and summarizes the sentiment of the creator comment. Encoder 110 may include a projection layer. The output of the recurrent neural network may be a fixed-size vector and may be passed through the projection layer. The projection layer may be a fully connected neural network with three output units for the three dimensions (e.g., positive sentiment, negative sentiment, and neutral sentiment). The projection layer may transform the recurrent neural network output into a three-dimensional space where each dimension corresponds to a specific sentiment attribute (e.g., positive, negative, and neutral). Each of the three output units in the projection layer may be passed through an activation function such as a softmax function. The softmax function may convert the raw output values into probabilities to ensure that the three-dimensional embedding sums to one (1). The final output of the projection layer may represent the three-dimensional sentiment embedding for the input creator comment. Each dimension of this embedding may correspond to the strength or confidence of the sentiment in that sentiment category (e.g., positive, negative, or neutral). In this way, a three-dimensional embedding can be generated for each of the N creator comments. The N three-dimensional embeddings may then be concatenated in time-order of the respective comments to form creator context encoding 116.

In some embodiments, the N creator comments that are input to encoder 110 to generate encoding 116 are the N comments made by the creator on content using system 100 immediately prior to creation of content 102. If N number of comments are not available for the creator, then any missing comments can be represented by a default three-dimensional embedding such as, for example, one where the neutral polarity score is one (1) and the polarity scores for positive and negative sentiments are zero (0) or other suitable default values. The number N can be selected according to the requirements of the particular implementation. For example, N may range between two (2) and twenty (20) comments.

In addition to inputting shared cascade context encoding 118 to classifier 122, post context encoding 120 may be input to classifier 122 to determine whether content 102 is or is not viral spam. Post context encoding 120 is generated by post context encoder 114 from post context 108. Post context 108 encompasses data that represents information about content 102. In some embodiments, post context 108 encompasses a set of time-ordered comments left by users on content 102. For example, post context 108 may encompass all comments on content 102 made by users of system 100. As another example, post context 108 may encompass the most recent K number of comments on content 102 made by users of system 100.

Figure 4:
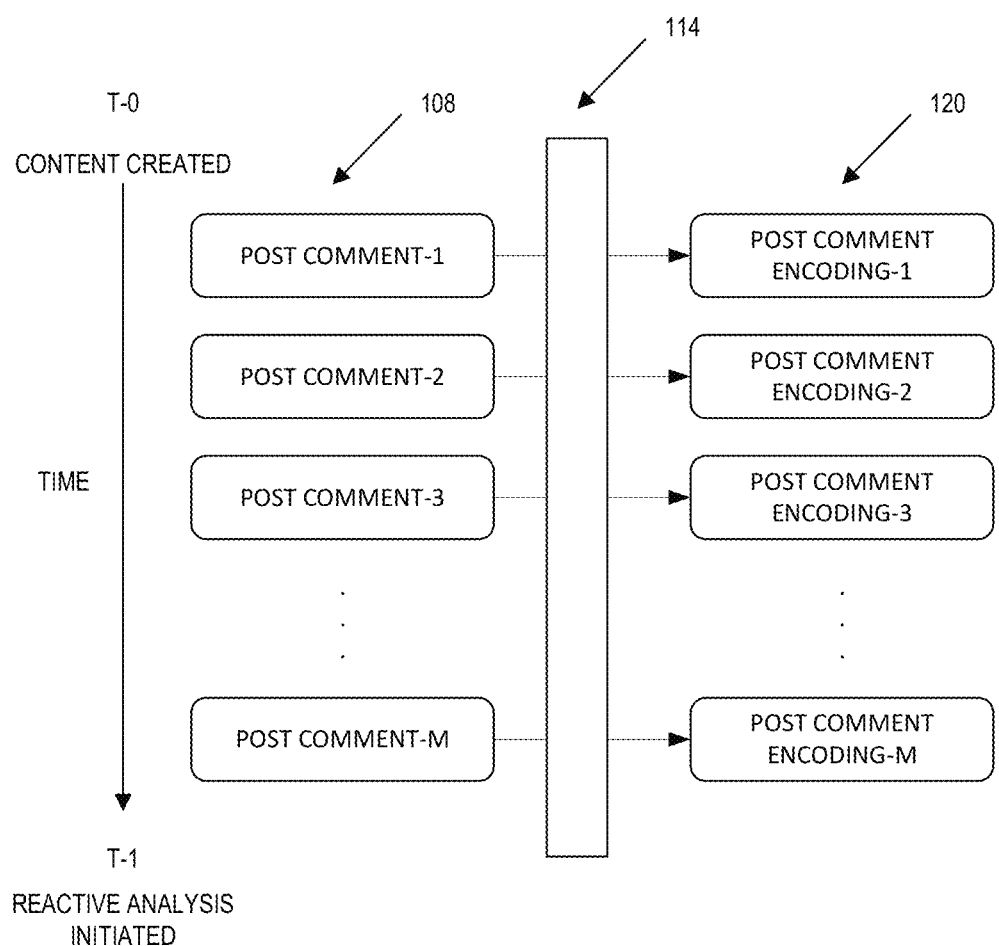
FIG. 4 illustrates example post context, according to some embodiments.

FIG. 4 illustrates post context 108, according to some embodiments. A series of M time-ordered comments by users on content 102 are made after the creation of content 102 at time T-0. For example, the post comments by the users may be made by users that view content 102. Post context encoder 114 is used to generate a respective post comment encoding for each post comment of post context 108. In some embodiments, each post comment encoding encompasses a three-element embedding for the respective post comment. Each element of the three-element embedding represents a respective polarity (sentiment) score for the respective post comment. In particular, one of the elements represents a positive polarity (sentiment) score for the respective post comment, a second of the elements represents a negative polarity (sentiment) score for the respective post comment, and a third of the elements represents a neutral polarity (sentiment) score for the respective post comment. Thus, for M number of post comments 108, creator context encoding 116 generated by encoder 114 for post comments 104 may have three (3) times M elements. For example, M may represent the number of comments on content 102 between the time content 102 is created at time T-0 and the time the reactive viral spam analysis of content 102 is initiated at time T-1.

In some embodiments, post context encoder 114 encompasses a recurrent neural network that is trained to generate a three-dimensional embedding representing the sentiment of input text (e.g., a post comment). Encoder 114 is trained to map variable-length text sequences to fixed-size numerical representations (embeddings). The process may involve using encoder 114 to encode the input text and then using a final layer to project the encoded sequence into a three-dimensional space that captures the sentiment information.

The input post comment may be tokenized into individual words or sub-words or other tokens. Each token may be represented as a word embedding or other dense numerical vector that captures the token's semantic meaning. These word embeddings may then be passed into the recurrent neural network of encoder 114 one by one, sequentially in the order of appearance in the post comment. The recurrent neural network may take the sequence of word embeddings as input and process them one at a time. At each time step, the recurrent neural network may take the current word embedding and combine it with the information from the previous time step. This process allows the recurrent neural network to maintain a memory of previous words and consider the entire post comment text sequence while generating the three-dimensional embedding.

After processing all the word embeddings of the post comment, the recurrent neural network may produce an output at the final time step. This output contains information about the entire post comment and summarizes the sentiment of the post comment. Encoder 114 may include a projection layer. The output of the recurrent neural network may be a fixed-size vector and may be passed through the projection layer. The projection layer may be a fully connected neural network with three output units for the three dimensions (e.g., positive sentiment, negative sentiment, and neutral sentiment). The projection layer may transform the recurrent neural network output into a three-dimensional space where each dimension corresponds to a specific sentiment attribute (e.g., positive, negative, and neutral). Each of the three output units in the projection layer may be passed through an activation function such as a softmax function. The softmax function may convert the raw output values into probabilities to ensure that the three-dimensional embedding sums to one (1). The final output of the projection layer may represent the three-dimensional sentiment embedding for the input post comment. Each dimension of this embedding may correspond to the strength or confidence of the sentiment in that sentiment category (e.g., positive, negative, or neutral). In this way, a three-dimensional embedding can be generated for each of the M post comments. The M three-dimensional embeddings may then be concatenated in time-order of the respective post comments to form post context encoding 120.

In some embodiments, the M post comments that are input to encoder 114 to generate encoding 120 are M most recent comments made by users on content 102 using system 100 immediately prior to initiation of reactive viral spam analysis of content 102 at time T-1. If M number of comments are not available, then any missing comments can be represented by a default three-dimensional embedding such as, for example, one where the neutral polarity score is one (1) and the polarity scores for positive and negative sentiments are zero (0) or other suitable default values. The number M can be selected according to the requirements of the particular implementation. For example, M may range between two (2) and twenty (20) comments.

To classify whether content is or is not viral spam, classifier 122 may accept as input creator context encoding 116, share cascade content encoding 118, and post context encoding 120. Each encoding 116, 118, and 120 represents different aspects of content 102 and its distribution across a social network. In particular, creator context encoding 116 represents information about the creator of content 102 including past commenting behavior or past engagement history, or other relevant features of the creator. Share cascade content encoding 118 captures the dynamics of content 102's spread through the social network, including information about users who shared content 102, reshare patterns, and engagement metrics. Post context encoding 120 represents engagement with content 102 itself, including commenting behavior on content 102 or other relevant features of content 102.

The three encodings 116, 118, and 120 may be concatenated together or otherwise combined to form a single feature vector that represents all the relevant information for the classification task. This concatenated or combined feature vector serves as the input to classifier 122. Classifier 122 can be any suitable machine learning classifier such as a Support Vector Machine (SVM), a logistic regression model, a random forest model, a gradient boosting tree model, or a deep learning neural network model.

While in some examples encodings 116, 118, and 120 are concatenated together to form an input to classifier 122, encodings 116, 118, and 120 are combined otherwise in other examples to form the input to classifier 122. For example, encodings 116, 118, and 120 can be combined using a weighted sum. This involves taking the three encodings and assigning individual weights to each encoding before adding them up. This process results in a single combined vector that captures the information of all three input encodings 116, 118, and 120 with the weights determining the importance of each encoding 116, 118, and 120 in the final combination. Essentially, the final combination is the weighted average of the three encodings 116, 118, and 120 where each encoding is scaled by its respective weight. The weights determine how much influence each encoding 116, 118, and 120 has on the final combined representation. If one encoding 116, 118, and 120 is considered to be more informative or more relevant to the classification task, then it can be assigned a higher weight. The weights can be set manually based on domain knowledge or empirical evidence or can be learned during the training process. In some examples, share cascade content encoding 118 is assigned a higher weight relative to the other two encodings 116 and 120 reflecting the relative importance of the share cascade information to classifier 122 in accurately classifying the combined input.

As another example of combining encodings 116, 118, and 120, an element-wise sum can be used in addition to or in combination with a weighted sum. Combining encodings 116, 118, and 120 using an element-wise sum may involve adding the corresponding elements of each encoding to create a single vector that effectively captures the collective information from the encodings 116, 118, and 120. If a weighted sum is also used, then the encodings 116, 118, and 120 can first be weighted as described previously and then an element-wise sum of the weighted encodings 116, 118, and 120 can be computed to yield a single vector that is input to classifier 122.

As yet another example, an attention mechanism may be used. It may do this by dynamically assigning weights to the encodings 116, 118, and 120 based on their relevance to the classification task of classifier 122 at hand. This process may involve the creation of a query vector that is used to compute attention scores for each encoding 116, 118, and 120. The query vector can be learned during training or chosen based on domain knowledge. Attention scores can then be computed for each encoding 116, 118, and 120 by calculating their similarity to the query vector using a similarity measure such as dot product, cosine similarity, or a learned function. The attention scores represent how relevant each encoding 116, 118, and 120 is to the query. The attention scores may be normalized using a softmax function to convert them into attention weight that sum to 1. These weights determine how much importance each encoding 116, 118, and 120 has in the final combination. Finally, the encodings 116, 118, and 120 may be combined using the calculated attention weights to create a context vector that captures the combined information from the encodings 116, 118, and 120 while emphasizing the most relevant parts.

Encodings 116, 118, and 120 also provide dimensionality reduction for classifier 122. The creator context information, the share cascade graph information, and the post context information for content are high-dimensional spaces. Encodings 116, 118, and 120 are generated for the content such that they reduce the number of features or dimensions of this information while preserving relevant information by which classifier 122 can make an accurate classification decision. By reducing dimensionality, the impact of noisy or irrelevant features in the information can be reduced or eliminated.

The combined feature vector is input to classifier 122 which makes a classification based on the information contained the input feature vector. Classifier 122 is previously trained on a labeled dataset. The dataset encompasses examples that are labeled as either viral spam or not viral spam. To classify new content, classifier 122 takes the combined feature vector for the new content as input. Classifier 122 applies the learned rules or patterns from the training data to the input feature vector and produces a prediction (classification). The prediction may be a prediction score or a probability indicating the likelihood that the content is or is not viral spam. For example, score can range from 0 to 1, where higher values indicate a higher probability of being viral spam. Depending on a chosen threshold, the content can be classified as either viral spam or not viral spam. To make a final decision, a threshold value may be set of the prediction score. For example, if the prediction score is above 0.5, then the content might be classified as viral spam. Otherwise, the content is classified as not viral spam. The choice of threshold can affect the balance between precision and recall, depending on the specific requirements of the implementation at hand.

Classifier 122 is trained using a labeled dataset. Classifier 122 may be jointly trained with creator context encoder 110, graph neural network (GNN) encoder 112, and post context encoder 114. In doing so, classifier 122 learns to map the concatenated feature vectors output by encoders 110, 112, and 114 during training to a binary output indicating viral spam or not viral spam.

In some embodiments, the ensemble model encompassing classifier 122 and encoders 110, 112, and 114 is jointly trained based on a set of training examples in which all (or significantly all) of the training examples are examples of viral content. Some of the training examples are examples of viral spam content and others of the training examples are examples of viral non-spam content. Experiments conducted have shown that when the ensemble model is trained using only (or substantially only) viral examples, the trained model is more effective detecting viral spam when applied to unseen samples compared to when the ensemble model is trained with a significant number of non-viral examples. This greater effectiveness may result from the fundamental differences in the nature of viral non-spam content and viral spam content in which viral spam as represented by the share cascade graph typically spreads through a social network via a multi-generational branching process from the originally shared content whereas viral non-spam content as represented by the share cascade graph typically spreads as a broadcast from the originally shared content.

After the ensemble model is trained, the ensemble model can be evaluated on a separate test dataset to assess its performance. Evaluation metrics such as accuracy, precisions, recall, F1 score, or area under the receiver operating characteristic (ROC) curve may be used to measure the effectiveness of classifier 122. Viral spam may be rare but nonetheless has a disproportionate impact on user experience. Viral spam, even though relatively rare, can have a much higher cost in terms of user experience due to the skewed popularity distribution of viral spam content. As a result, optimizing performance of the ensemble model for standard classifier evaluation metrics like precision and recall may not be suitable in the viral spam detection scenario because these metrics do not directly consider the non-uniform cost of viral spam on the user experience. Accordingly, in some embodiments, a user engagement virality index (UEVI) is used to evaluate the performance of the ensemble model on the test dataset. UEVI may be defined as the number of users who have viewed or interacted with the viral content. Since the UEVI metric is proportional to the views on spam content, it addresses shortcomings of the precision and recall metrics. For example, consider 100 viral spam content items out of which 99 of those viral spam content items contribute to 1 million views and the remaining 1 viral spam content item contributes to 1 million views. If the ensemble model classifies the 99 content items as viral spam (true positive) but fails to classify the 1 viral spam content item as viral spam (false negative), then the recall of the ensemble model is 99% but the UEVI is only 1 million (e.g., 50% of the total viral spam content item views). Thus, UEVI may give a better picture of the performance of the trained ensemble model when used to classify the test dataset.

Figure 5:
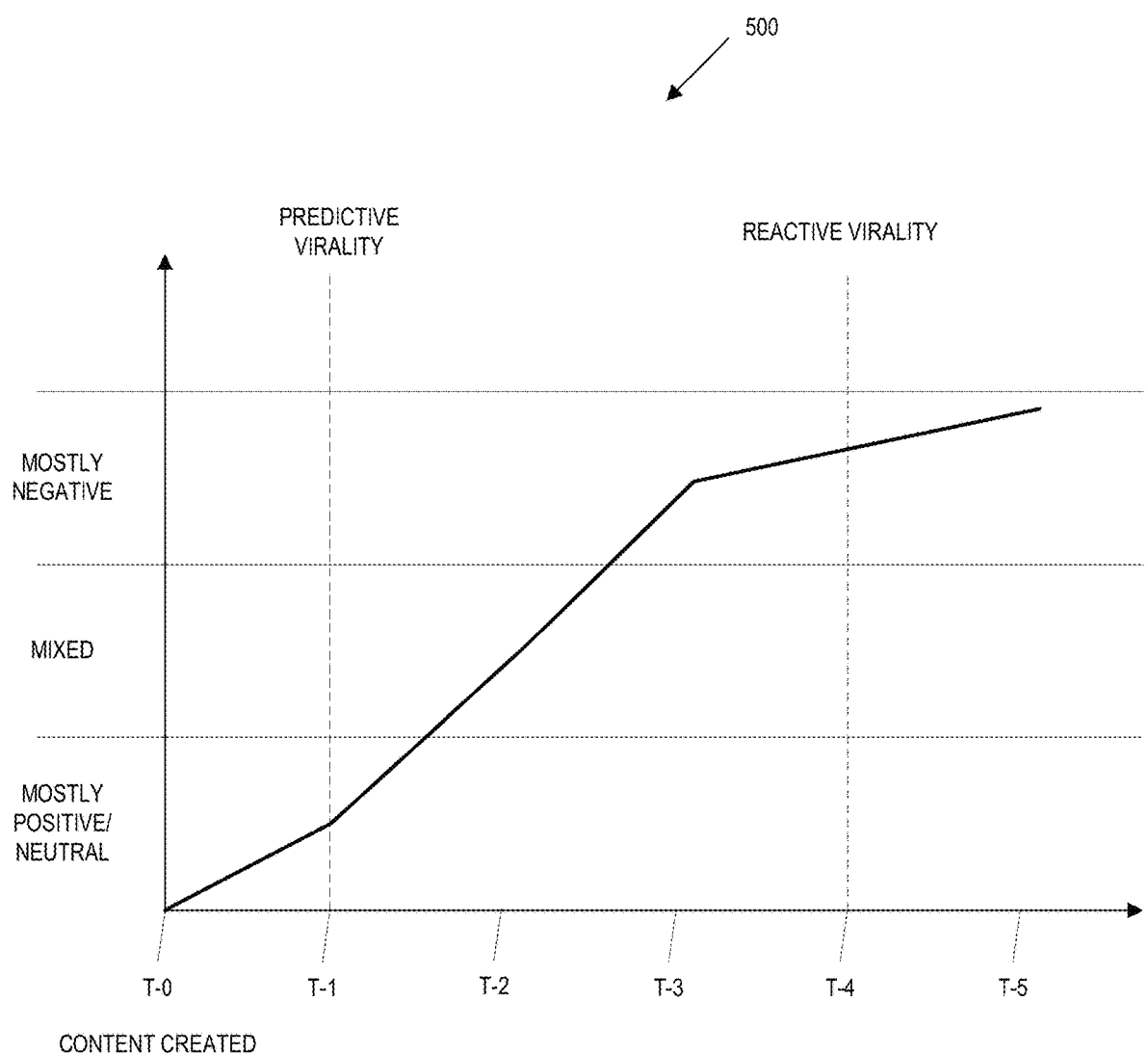
FIG. 5 illustrates the usefulness of the reactive approach to viral spam detection compared to more proactive or predictive approaches, according to some embodiments.

FIG. 5 illustrates the usefulness of the reactive approach to viral spam detection compared to more proactive or predictive approaches, according to some embodiments. At time T-0, content is created. Between time T-0 and time T-1 the content receives mostly positive or neutral reaction from users. A predictive analysis conducted at time T-1 may determine that the content is not viral spam based on the mostly positive or neutral user reactions to the content so far. Between time T-1 and time T-4 the content begins to receive mixed and negative reactions from users and by time T-4 the content is receiving mostly negative reactions. The reactive vitality analysis of the content may be conducted at time T-4 based on the content having received more than a threshold number of views. The reactive analysis can detect the content as viral spam before it does further or significant damage on the platform.

Figure 6:
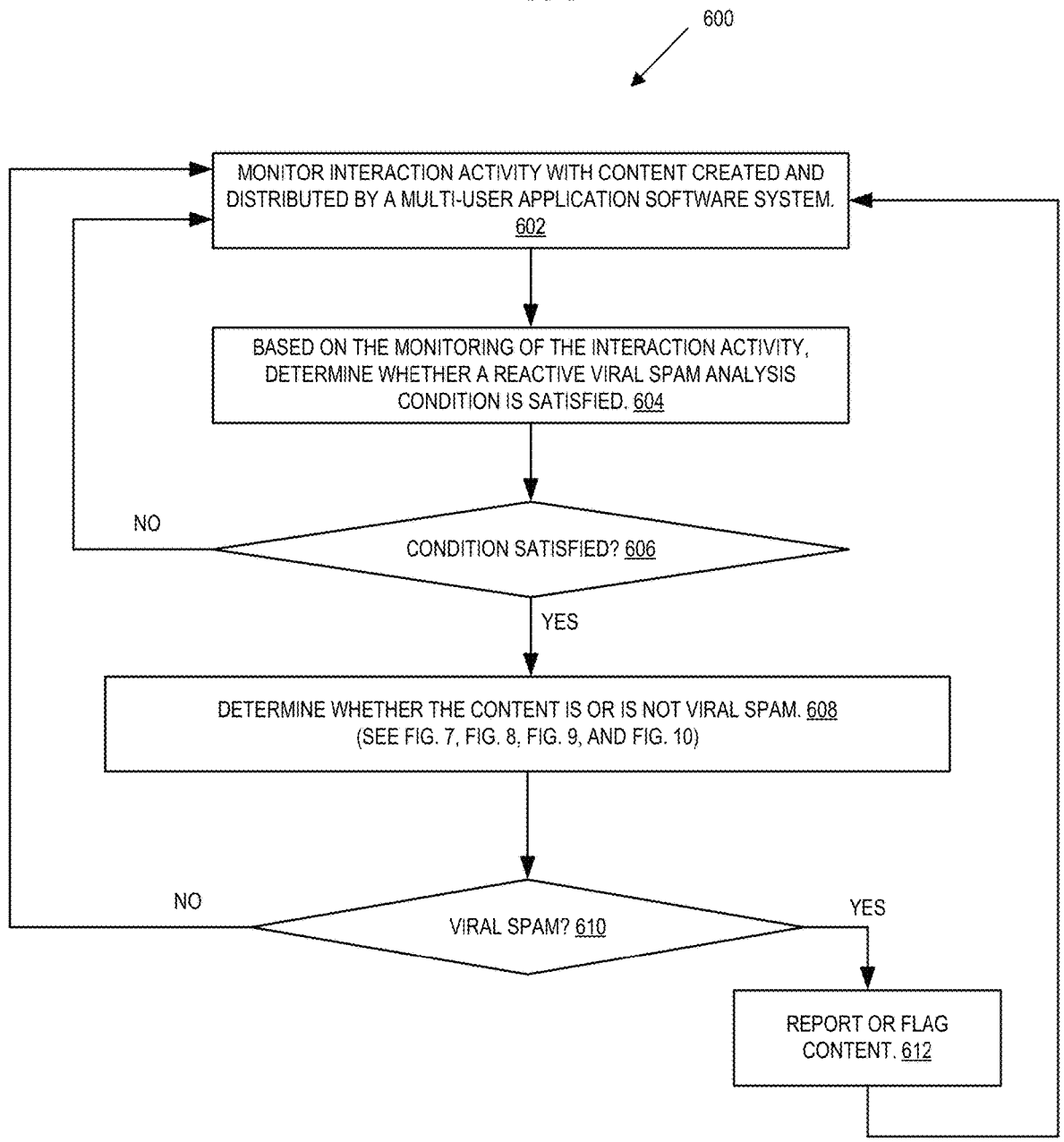
FIG. 6 is a flowchart of a method for reactive viral spam detection, according to some embodiments.

FIG. 6 is a flowchart of method 600 for reactive viral spam detection, according to some embodiments. The method 600 may be performed by a multi-user application software system (e.g., system 100) executing on one or more computing devices.

At step 602, the system monitors 602 interaction activity with content created and distributed by the software system. The interaction activity may encompass user engagement activity with the content such as any or all of: likes, comments, shares, views, or downloads.

At step 604, the system determines 604 whether a reactive viral spam analysis condition is satisfied. The system makes this determination based on the interaction activity with the content. In some embodiments, determining 604 whether the reactive viral spam analysis condition is satisfied is based on determining any of all of the following conditions: whether a number of likes on the content exceeds a threshold, whether a number of shares of the content exceeds a threshold, whether a number of views of the content exceeds a threshold, or whether a number of downloads of the content exceeds a threshold. A threshold can be selected according to the requirements of the particular implementation at hand. For example, a threshold can be selected such that at least X % of all content satisfies the reactive viral spam analysis condition. For example, X can be 2%, 5%, 10%, 15%, or 20% of all content.

If, at step 606, the system determines 606 that the reactive viral spam analysis condition is satisfied for the monitored content, then the method 600 proceeds to step 608 where the system determines whether the content is or is not viral spam. Different approaches for step 608 are depicted in FIG. 7, FIG. 8, FIG. 9, and FIG. 10. On the other hand, if, at step 606, the system determines 606 that the reactive viral spam analysis condition is not satisfied for the monitored content, then the system can continue to monitor 602 interaction activity with the content to determine if the reactive viral spam analysis of the content should be conducted.

FIG. 7 illustrates a first method 700 for determining 608 whether the content is or is not viral spam, according to some embodiments. According to first method 700, a share cascade graph (e.g., share cascade context 106) is obtained 702 for the content. A trained graph neural network (e.g., graph neural network encoder 112) is used to generate 704 a graph neural network encoding (e.g., share cascade context encoding 118) of the share cascade graph. And a trained machine learning classifier (e.g., classifier 122) is used to classify 706 the content as viral spam or not viral spam based on the graph neural network encoding.

Figure 8:
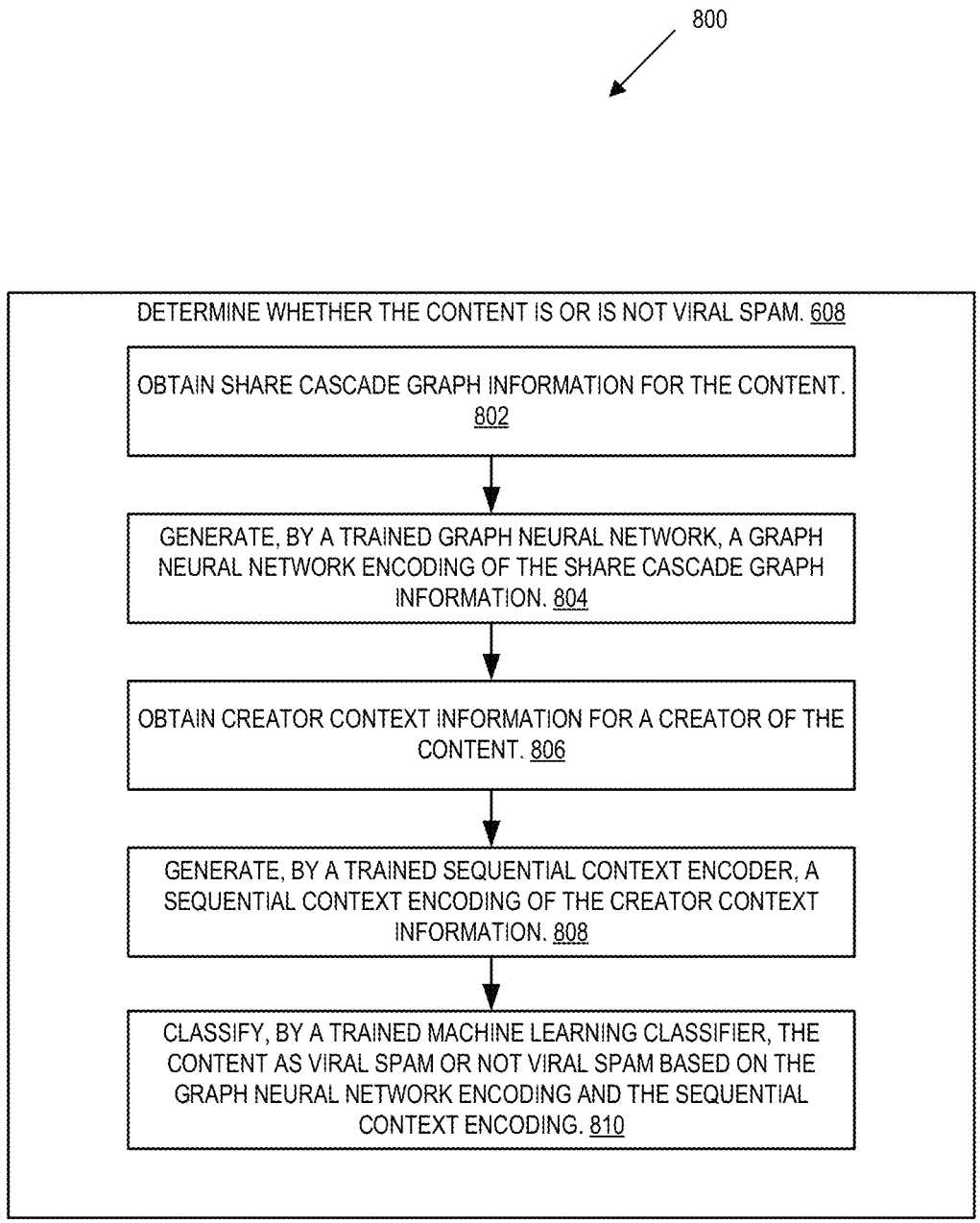
FIG. 8 illustrates a second method for determining whether the content is or is not viral spam, according to some embodiments.

FIG. 8 illustrates a second method 800 for determining 608 whether the content is or is not viral spam, according to some embodiments. According to second method 800, a share cascade graph (e.g., share cascade context 106) is obtained 802 for the content. A trained graph neural network (e.g., graph neural network encoder 112) is used to generate 804 a graph neural network encoding (e.g., share cascade context encoding 118) of the share cascade graph. Creator context information (e.g., creator context 104) is obtained 806 for a creator of the content. A trained sequential context encoder (e.g., creator context encoder 110) is used to generate 808 a sequential context encoding (e.g., creator context encoding 116) of the creator context information. A trained machine classifier (e.g., classifier 122) is used to classify 810 the content as viral spam or not viral spam based on the graph neural network encoding and the sequential context encoding of the creator context information.

Figure 9:
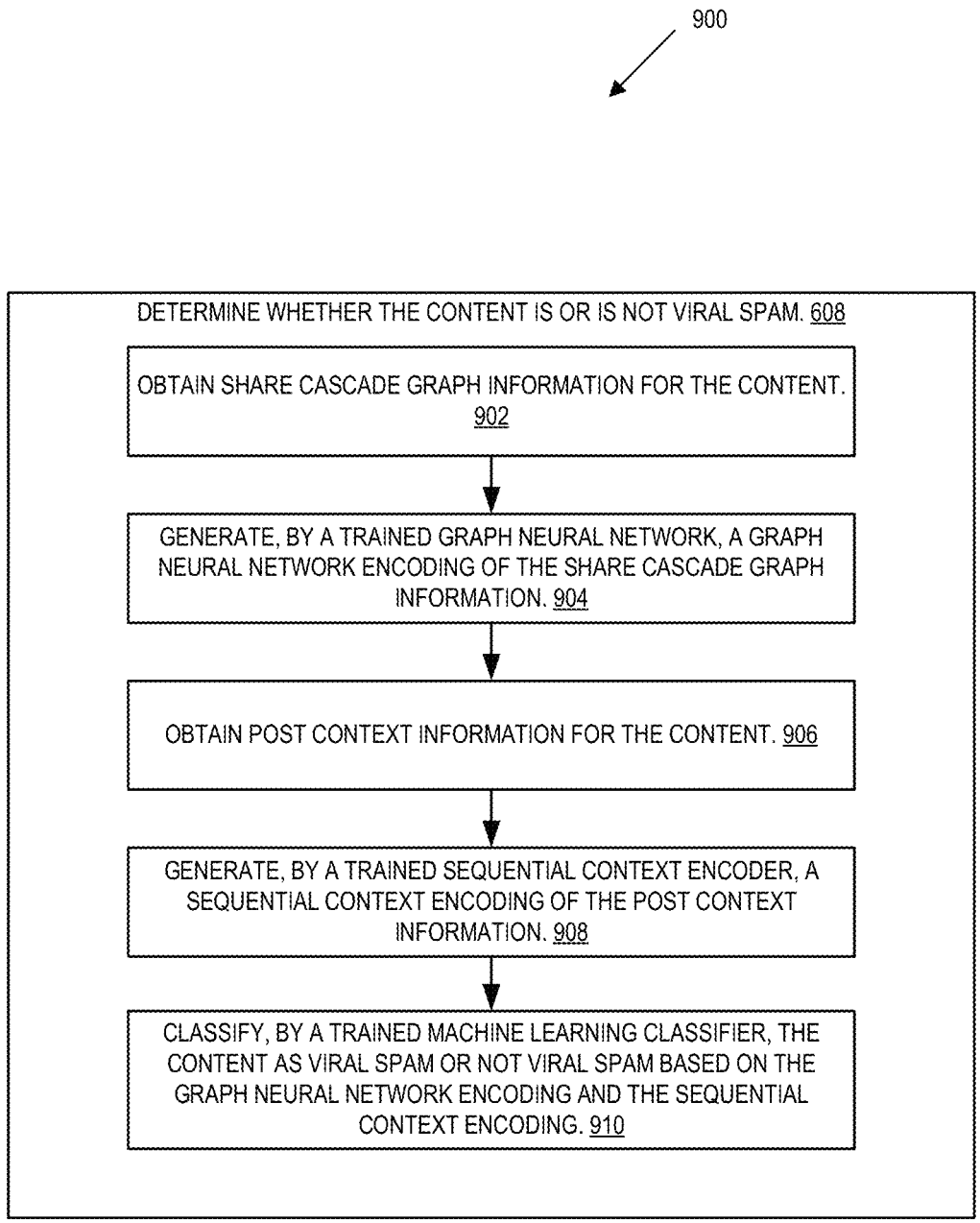
FIG. 9 illustrates a third method for determining whether the content is or is not viral spam, according to some embodiments.

FIG. 9 illustrates a third method 900 for determining 608 whether the content is or is not viral spam, according to some embodiments. According to third method 900, a share cascade graph (e.g., share cascade context 106) is obtained 902 for the content. A trained graph neural network (e.g., graph neural network encoder 112) is used to generate 904 a graph neural network encoding (e.g., share cascade context encoding 118) of the share cascade graph. Post context information (e.g., post context 108) is obtained 906 for the content. A trained sequential context encoder (e.g., post context encoder 114) is used to generate 908 a sequential context encoding (e.g., post context encoding) of the post context information. A trained machine classifier (e.g., classifier 122) is used to classify 910 the content as viral spam or not viral spam based on the graph neural network encoding and the sequential context encoding of the post context information.

Figure 10:
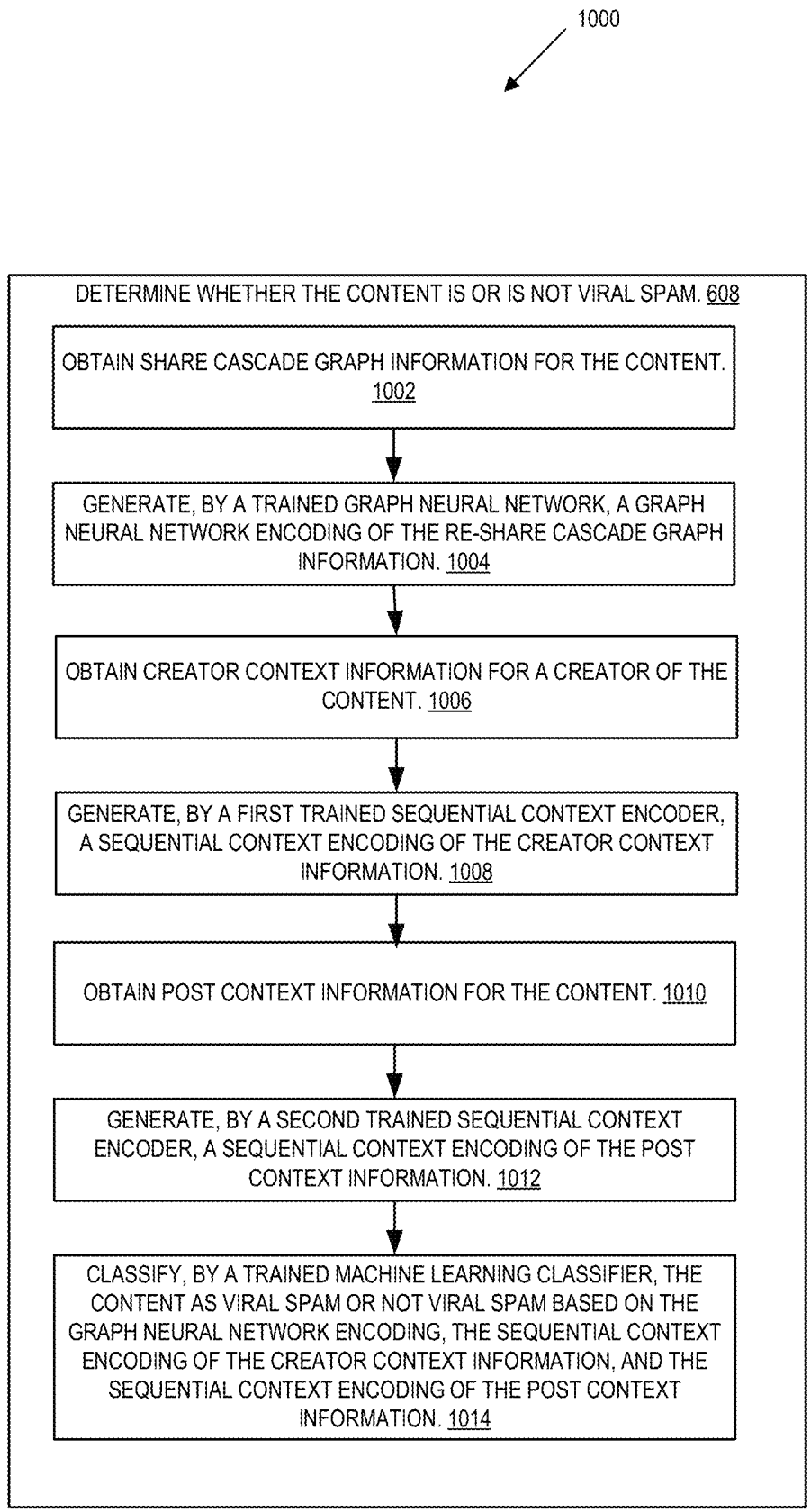
FIG. 10 illustrates a fourth method for determining whether the content is or is not viral spam, according to some embodiments.

FIG. 10 illustrates a fourth method 1000 for determining 608 whether the content is or is not viral spam, according to some embodiments. According to the fourth method 1000, a share cascade graph (e.g., share cascade context 106) is obtained 1002 for the content. A trained graph neural network (e.g., graph neural network encoder 122) is used to generate 1004 a graph neural network encoding (e.g., share cascade context encoding 118) of the share cascade graph. Creator context information (e.g., creator context 104) is obtained 1006 for a creator of the content. A trained sequential context encoder (e.g., creator context encoder 110) is used to generate 1008 a sequential context encoding (e.g., creator context encoding 116) of the creator context information. Post context information (e.g., post context 108) is obtained 1010 for the content. A trained sequential context encoder (e.g., post context encoder 114) is used to generate 1012 a sequential context encoding (e.g., post context encoding 120) of the post context information. A trained machine learning classifier (e.g., classifier 122) is used to classify 1014 the content as viral spam or not viral spam based on the graph neural network encoding, the sequential context encoding of the creator context, and the sequential context encoding of the post context.

Returning to FIG. 6, the system determines 610 based on the output of the trained machine learning classifier if the content is viral spam or not viral spam. For example, the output of the trained machine learning classifier may be a binary value specifying whether the content is or is not viral spam. Alternatively, the output of the trained machine learning classifier may be a probability value (e.g., a value between 0 and 1) that specifies the probability that the content is or is not viral spam. The system may determine 610 the content is viral spam if the probability value is above a threshold probability value or below a threshold probability value depending on whether a higher probability value is indicative of viral spam or not viral spam. If the system determines 610 that the content is viral spam, then the system report or flag 612 the content for further analysis. For example, the content may be reported or flagged for manual review by a human to determine if the content should be taken down or demoted on the platform so that its virality on the platform slows or stops. If the system determines 610 that the content is not viral spam, then the system may return to the top of method 600 to resume monitoring interaction activity with the content for a possible subsequent determination that the content is viral spam.

Figure 11:
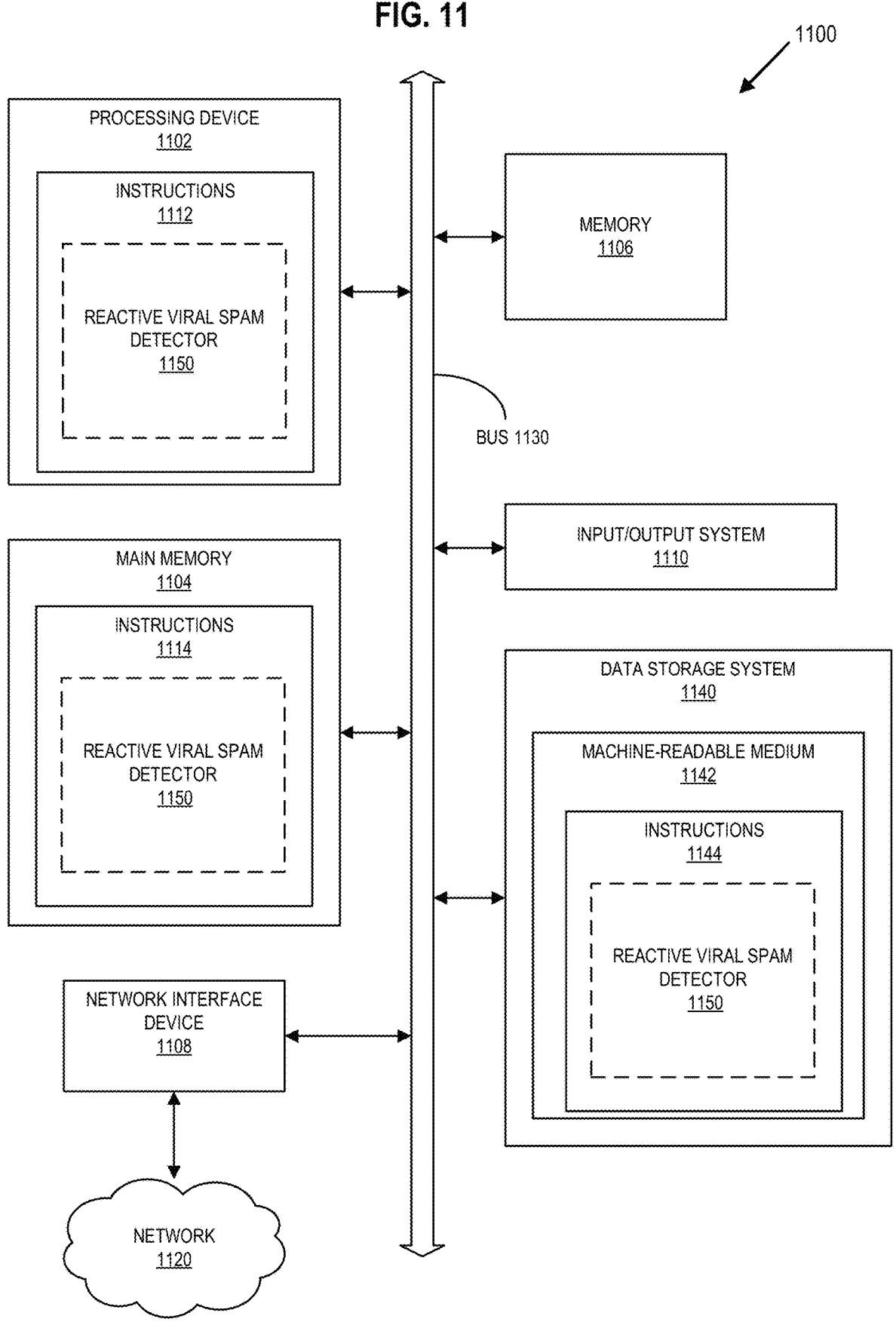
FIG. 11 is a block diagram of an example computer system including components of a reactive viral spam detection system in accordance with some embodiments of the present disclosure.

FIG. 11 is a block diagram of an example computer system including components of a reactive viral spam detection system in accordance with some embodiments of the present disclosure.

In FIG. 11, an example machine of a computer system 1100 is shown, within which a set of instructions, for causing the machine to perform any of the methodologies discussed herein, can be executed. In some embodiments, the computer system 1100 can correspond to a component of a networked computer system (e.g., as a component of application software system 100 of FIG. 1) that includes, is coupled to, or utilizes a machine to execute an operating system to perform operations corresponding to one or more components of system 100 of FIG. 1. For example, computer system 1100 corresponds to a portion of computing system when the computing system is executing a portion of system 100.

The machine is connected (e.g., networked) to other machines in a local area network (LAN), an intranet, an extranet, or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a memory 1106 (e.g., flash memory, static random access memory (SRAM), etc.), an input/output system 1110, and a data storage system 1140, which communicate with each other via a bus 1130.

Processing device 1102 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be at least one special-purpose processing device such as an application specific integrated circuit (ASIC), a field programmable gate array (FPGA), a digital signal processor (DSP), network processor, or the like. The processing device 1102 is configured to execute instructions 1112 for performing the operations and steps discussed herein.

In FIG. 11, reactive viral spam detector 1150 represents portions of system 100 when the computer system 1100 is executing those portions of system 100. Instructions 1112 include portions of detector 1150 when those portions of system 100 are being executed by processing device 1102. Thus, detector 1150 is shown in dashed lines as part of instructions 1112 to illustrate that, at times, portions of detector 1150 are executed by processing device 1102. For example, when at least some portion of detector 1150 is embodied in instructions to cause processing device 1102 to perform the method(s) described above, some of those instructions can be read into processing device 1102 (e.g., into an internal cache or other memory) from main memory 1104 or data storage system 1140. However, it is not required that all of detector 1150 be included in instructions 1112 at the same time and portions of detector 1150 are stored in at least one other component of computer system 1100 at other times, e.g., when at least one portion of detector 1150 are not being executed by processing device 1102.

The computer system 1100 further includes a network interface device 1108 to communicate over the network 1120. Network interface device 1108 provides a two-way data communication coupling to a network. For example, network interface device 1108 can be an integrated-services digital network (ISDN) card, cable modem, satellite modem, or a modem to provide a data communication connection to a corresponding type of telephone line. As another example, network interface device 1108 can be a local area network (LAN) card to provide a data communication connection to a compatible LAN. Wireless links can also be implemented. In any such implementation network interface device 1108 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1100.

Computer system 1100 can send messages and receive data, including program code, through the network(s) and network interface device 1108. In the Internet example, a server can transmit a requested code for an application program through the Internet and network interface device 1108. The received code can be executed by processing device 1102 as it is received, or stored in data storage system 1140, or other non-volatile storage for later execution.

The input/output system 1110 includes an output device, such as a display, for example a liquid crystal display (LCD) or a touchscreen display, for displaying information to a computer user, or a speaker, a haptic device, or another form of output device. The input/output system 1110 can include an input device, for example, alphanumeric keys and other keys configured for communicating information and command selections to processing device 1102. An input device can, alternatively or in addition, include a cursor control, such as a mouse, a trackball, or cursor direction keys for communicating direction information and command selections to processing device 1102 and for controlling cursor movement on a display. An input device can, alternatively or in addition, include a microphone, a sensor, or an array of sensors, for communicating sensed information to processing device 1102. Sensed information can include voice commands, audio signals, geographic location information, or digital imagery, for example.

The data storage system 1140 includes a machine-readable storage medium 1142 (also known as a computer-readable medium) on which is stored at least one set of instructions 1144 or software embodying any of the methodologies or functions described herein. The instructions 1144 can also reside, completely or at least partially, within the main memory 1104 or within the processing device 1102 during execution thereof by the computer system 1100, the main memory 1104 and the processing device 1102 also constituting machine-readable storage media.

In one embodiment, the instructions 1144 include instructions to implement functionality corresponding to the reactive viral spam detection system (e.g., portions of system 100 of FIG. 1).

Dashed lines are used in FIG. 11 to indicate that it is not required that detector 1150 be embodied entirely in instructions 1112, 1114, and 1144 at the same time. In one example, portions of detector 1150 are embodied in instructions 1144, which are read into main memory 1104 as instructions 1114, and portions of instructions 1114 are read into processing device 1102 as instructions 1112 for execution. In another example, some portions of detector 1150 are embodied in instructions 1144 while other portions are embodied in instructions 1114 and still other portions are embodied in instructions 1112.

While the machine-readable storage medium 1142 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 11 and the accompanying description, above, are provided for illustration purposes. This disclosure is not limited to the described examples.

Some portions of the preceding detailed description have been presented in terms of algorithms and symbolic representations of operations on data bits within a computer memory.

These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 200, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein and in the appended claims, unless otherwise clear in context, the terms "comprising," "having," "containing," "including," or other similar terms are intended to be equivalent in meaning and be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular relationship. For example, unless otherwise clear in context, a "first device" could be termed a "second device."

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for reactive viral spam detection, the method comprising:
   monitoring interaction activity with a content item created and distributed by a multi-user application software system;
   based on the monitoring of the interaction activity, determining that a reactive viral spam analysis condition is satisfied;
   in response to determining that the reactive viral spam analysis condition is satisfied, determining whether the content item is or is not viral spam; and
   wherein determining whether the content item is or is not viral spam is based on:
      obtaining creator context information for a creator of the content item, the creator context information comprising comments left by the creator of the content item before the content item is created by the creator,
      obtaining share cascade graph information for the content item,
      obtaining post context information for the content item, the post context information representing interaction activity with the content item,
      generating, by a first trained sequential context encoder, a first sequential context encoding of the creator context information,
      generating, by a trained graph neural network, a graph neural network encoding of the share cascade graph information,
      generating, by a second trained sequential context encoder, a second sequential context encoding of the post context information, and
      classifying, by a trained machine learning classifier, the content item as viral spam or not viral spam based on at least the first sequential context encoding, the graph neural network encoding, and the second sequential context encoding.

2. The method of claim 1, wherein the creator context information further comprises a respective set of one or more polarity scores for each comment of a sequence of comments by the creator on a set of content items.

3. The method of claim 1, wherein the post context information comprises a respective set of one or more polarity scores for each comment of a sequence of comments on the content item.

4. The method of claim 1, further comprising:
   jointly training a graph neural network and a machine learning classifier based on a set of labeled training examples to yield the trained graph neural network and the trained machine learning classifier, wherein each labeled training example of the set of labeled training examples comprises respective share cascade graph information and a respective label.

5. The method of claim 4, wherein the respective label of each labeled training example of the set of labeled training examples indicates whether the respective share cascade graph represents viral spam or represents viral non-spam.

6. The method of claim 1, further comprising:
   jointly training a first sequential context encoder, a second sequential context encoder, a graph neural network, and a machine learning classifier based on a set of labeled training examples to yield the first trained sequential context encoder, the second trained sequential context encoder, the trained graph neural network, and the trained machine learning classifier, wherein each labeled training example of the set of labeled training examples comprises respective creator context information, respective shared cascade graph information, respective post context information, and a respective label.

7. The method of claim 1, wherein monitoring, by the multi-user application software system, the interaction activity with the content item comprises accumulating, by the multi-user application software system, a number of views of the content item; and
   wherein determining, by the multi-user application software system, that the reactive viral spam analysis condition is satisfied based on the monitoring of the interaction activity comprises determining that the number of views of the content item exceeds a threshold number of views.

8. The method of claim 1, wherein the share cascade graph information for the content item comprises directed acyclic graph information for the content item, the directed acyclic graph information indicating a root node and one or more child nodes of a graph, the directed acyclic graph information indicating that the root node represents the content item and each child node of the one or more child nodes represents respective shared content comprising the content item.

9. A non-transitory machine-readable storage medium storing instructions for reactive viral spam detection, the instructions, when executed by a set of one or more processors of a computer system, cause the computer system to perform operations comprising:
   monitoring interaction activity with a content item created and distributed by a multi-user application software system;
   based on the monitoring of the interaction activity, determining that a reactive viral spam analysis condition is satisfied;
   in response to determining that the reactive viral spam analysis condition is satisfied, determining whether the content item is or is not viral spam; and wherein determining whether the content item is or is not viral spam is based on:

obtaining creator context information for a creator of the content item, the creator context information comprising comments left by the creator of the content item before the content item is created by the creator, obtaining share cascade graph information for the content item, obtaining post context information for the content item, the post context information representing interaction activity with the content item, generating, by a first trained sequential context encoder, a first sequential context encoding of the creator context information, generating, by a trained graph neural network model, a graph neural network encoding of the share cascade graph information, generating, by a second trained sequential context encoder, a second sequential context encoding of the post context information, and configuring a machine learning classifier to classify the content item as viral spam or not viral spam based on at least the first sequential context encoding, the graph neural network encoding, and the second sequential context encoding.

10. The non-transitory machine-readable storage medium of claim 9, wherein the creator context information further comprises a respective set of one or more polarity scores for each comment of a sequence of comments by the creator on a set of content items.

11. The non-transitory machine-readable storage medium of claim 9, wherein the post context information comprises a respective set of one or more polarity scores for each comment of a sequence of comments on the content item.

12. A system for reactive viral spam detection, the system comprising:

a set of one or more processors;

memory coupled to the set of one or more processors; and wherein the memory comprises instructions which, when executed by the set of one or more processors, cause the system to perform operations comprising:

monitoring interaction activity with a content item created and distributed by a multi-user application software system;

based on the monitoring of the interaction activity, determining that a reactive viral spam analysis condition is satisfied;

in response to determining that the reactive viral spam analysis condition is satisfied, determining whether the content item is or is not viral spam; and wherein determining whether the content item is or is not viral spam is based on:

obtaining creator context information for a creator of the content item, the creator context information comprising comments left by the creator of the content item before the content item is created by the creator, obtaining share cascade graph information for the content item, obtaining post context information for the content item, the post context information representing interaction activity with the content item, generating, by a first trained sequential context encoder, a first sequential context encoding of the creator context information, generating, by a trained graph neural network, a graph neural network encoding of the share cascade graph information, generating, by a second trained sequential context encoder, a second sequential context encoding of the post context information, and classifying, by a trained machine learning classifier, the content item as viral spam or not viral spam based on at least the first sequential context encoding, the graph neural network encoding, and the second sequential context encoding.

13. The system of claim 12, wherein the creator context information further comprises a respective set of one or more polarity scores for each comment of a sequence of comments by the creator on a set of content items.

14. The system of claim 12, wherein the post context information comprises a respective set of one or more polarity scores for each comment of a sequence of comments on the content item.

15. The system of claim 12, the operations further comprising:

jointly training a graph neural network and a machine learning classifier based on a set of labeled training examples to yield the trained graph neural network and the trained machine learning classifier, wherein each labeled training example of the set of labeled training examples comprises respective share cascade graph information and a respective label.

16. The system of claim 15, wherein the respective label of each labeled training example of the set of labeled training examples indicates whether the respective share cascade graph represents viral spam or represents viral non-spam.

17. The system of claim 12, further comprising:

jointly training a first sequential context encoder, a second sequential context encoder, a graph neural network, and a machine learning classifier based on a set of labeled training examples to yield the first trained sequential context encoder, the second trained sequential context encoder, the trained graph neural network, and the trained machine learning classifier, wherein each labeled training example of the set of labeled training examples comprises respective creator context information, respective shared cascade graph information, respective post context information, and a respective label.

18. The system of claim 12, wherein monitoring, by the multi-user application software system, the interaction activity with the content item comprises accumulating, by the multi-user application software system, a number of views of the content item; and wherein determining, by the multi-user application software system, that the reactive viral spam analysis condition is satisfied based on the monitoring of the interaction activity comprises determining that the number of views of the content item exceeds a threshold number of views.

19. The system of claim 12, wherein the share cascade graph information for the content item comprises directed acyclic graph information for the content item, the directed acyclic graph information indicating a root node and one or more child nodes of a graph, the directed acyclic graph information indicating that the root node represents the content item and each child node of the one or more child nodes represents respective shared content comprising the content item.

\* \* \* \* \*